United States Patent
Charny et al.

(10) Patent No.: US 7,231,425 B1
(45) Date of Patent: Jun. 12, 2007

(54) RATE-BASED SCHEDULING METHOD AND SYSTEM

(75) Inventors: Anna Charny, Sudbury, MA (US); Robert Olsen, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 10/243,436

(22) Filed: Sep. 13, 2002

(51) Int. Cl.
*G06F 15/16* (2006.01)

(52) U.S. Cl. ............... 709/205; 709/202; 370/230; 719/318; 719/314

(58) Field of Classification Search ............ 709/223, 709/224, 100, 102, 103, 201, 202, 205; 370/230, 370/231; 719/318, 319
See application file for complete search history.

(56) References Cited

U.S. PATENT DOCUMENTS

| | | | |
|---|---|---|---|
| 5,844,890 A | * | 12/1998 | Delp et al. ............ 370/230 |
| 5,864,540 A | | 1/1999 | Bonomi et al. ............ 370/235 |
| 6,014,367 A | * | 1/2000 | Joffe ............ 370/230 |
| 6,130,878 A | | 10/2000 | Charny ............ 370/395.41 |
| 6,408,005 B1 | | 6/2002 | Fan et al. ............ 370/412 |
| 6,744,743 B2 | * | 6/2004 | Walton et al. ............ 370/318 |

* cited by examiner

*Primary Examiner*—Jason Cardone
*Assistant Examiner*—Adrian M. Mirza
(74) *Attorney, Agent, or Firm*—Cindy Kaplan

(57) ABSTRACT

A rate-based scheduling system and method are disclosed. The rate-based system generally includes a first scheduler operable to limit the maximum rates at each of the plurality of queues. The first scheduler is configured as a work conserving scheduler shaped at an aggregate rate of active queues of the plurality of queues. The system further includes a second scheduler operable to provide a minimum rate to each of the plurality of queues and a rate controller configured to modulate the rate of at least one of the first and second schedulers.

20 Claims, 4 Drawing Sheets

RATE-BASED SCHEDULING METHOD AND SYSTEM

BACKGROUND OF THE INVENTION

The present invention relates generally to communication networks, and more specifically, to a method and system for rate-based scheduling.

High speed networks are designed to carry services with a wide range of traffic characteristics and quality-of-service (QoS) requirements. A common task for rate-based QoS enabled scheduling is ensuring that each queue is guaranteed a minimum rate, excess bandwidth is shared in a fair manner, each queue does not exceed a specified maximum rate, and the link is maximally utilized within the maximum rate constraints. While many implementations target this problem, current implementations either scale linearly with the number of queues, or result in substantial underutilization or unfairness.

As noted above, it is important for environments with large numbers of queues that its scheduling system operates in a scaleable manner. Incoming traffic streams flow through the queues ($q_0$–$q_n$) and a scheduler serves each queue to support a maximum rate ($m_0$–$m_n$). Conventional schedulers use O(n) (order (n)) algorithms to perform the scheduling and shaping of the queues. However, at some level of scalability, these algorithms become either infeasible (e.g., there is no available CPU that can process at the required rate) or cost ineffective (e.g., the amount of hardware required to perform the O(n) operation at the required performance level is too costly).

A typical approach taken by conventional scheduler implementations to ensure rate-limiting to maximum rates is to use a set of token-bucket shapers (one per queue). This typically results in an O(n) complexity, as previously described. It is possible to reduce the complexity, in cases where the total rates of all queues do not exceed the link rate, by scheduling the queue eligibility times on a real-time calendar queue. However, this approach does not work in the typical case when the maximum rates are overbooked, and also causes substantial underutilization.

SUMMARY OF THE INVENTION

A rate-based scheduling system and method are disclosed herein. The rate-based scheduling system generally includes a first scheduler operable to limit the maximum rates at each of the plurality of queues. The first scheduler is configured as a work conserving scheduler shaped at an aggregate rate of active queues of the plurality of queues. The system further includes a second scheduler operable to provide a minimum rate to each of the plurality of queues. Finally, the system includes a rate controller configured to modulate the rate of the first and second schedulers.

The herein disclosed method of rate-based scheduling a plurality of data packets arriving at a node having a plurality of queues generally includes modulating rates of the first and second scheduler with a rate controller and shaping an aggregate scheduling rate of the first and second schedulers to a rate that is dynamically changing as a function of the rates of currently active queues.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers and switches. A scheduler system of the present system is located in one or more of the network elements.

The scheduling system is used to schedule a number of queues (q(1), q(2), . . . q(N)) with a goal of ensuring that each queue q(i) is guaranteed a specified minimum rate R(i) and at the same time limiting the transmission rate from this queue to another specified maximum rate M(i). The system is configured such that for any queue q(i), R(i) is less than or equal to M(i) and that the sum of R(i) over all i=1, 2 . . . N does not exceed the speed of the link. As described below, the scheduling system is constructed in a hierarchical manner. At the top level of the hierarchy there is a rate controller. At the next level of the hierarchy there are two different schedulers. One scheduler is used to provide minimal rates while the other is used to limit the maximum rates.

Figure 1:
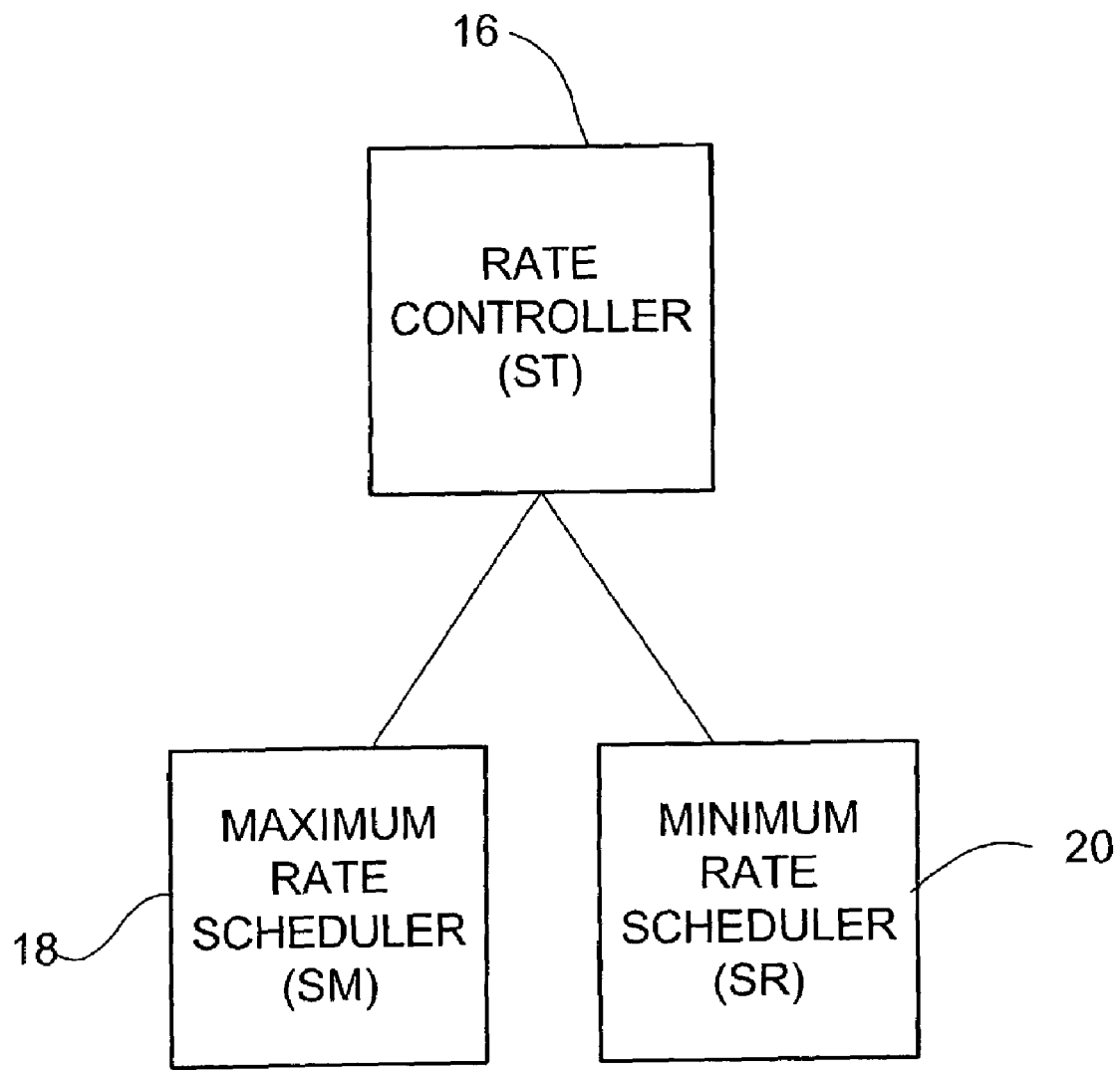
FIG. 1 is a block diagram of one embodiment of the scheduling system.

Referring now to the drawings, and first to FIG. 1, a diagram of the scheduler system using a two-level aggregate shaping framework (ASF) is shown. The first level of the scheduler is a variable-rate rate controller (top-level scheduler ST) 16. The second level of the system includes a first and second rate-proportional scheduler, maximum rate scheduler SM 18, and minimum rate scheduler SR 20. The goal of SM scheduler 18 is to guarantee that each queue i receives the share of excess bandwidth (e.g. unused bandwidth of the link after each active queue gets its minimal guaranteed rate) in proportion to M(i)–R(i). The goal of SR scheduler 20 is to ensure that each queue i is given at least its guaranteed rate R(i). The goal of rate-controller 16 is to ensure that the total amount of bandwidth given to SM scheduler 18 is bounded by the sum of M(i)–R(i) over all active queues at all times. Since the set of active queues is varied over time, ST(i) is a variable-rate rate-controller.

At a high level, the scheduling system operates as follows. At each new scheduling opportunity, ST scheduler 16 chooses between schedulers SM 18 and SR 20. If SR scheduler 20 (or SM 18) is chosen, the SR scheduler 20 (or SM 18) chooses one of the queues that are non-empty, and sends a packet from that queue. If the queue becomes empty, the shaping rates of the ST scheduler 16 are updated by removing the rate R(i) from the aggregate shaping rate of scheduler SR 20, and by removing M(i)−R(i) from the aggregate shaping rate of scheduler SM 18. If a packet arrives to an empty queue, then the corresponding rates are added to the aggregate shaping rate of the SM and SR schedulers 18, 20 in the ST scheduler 16. Each queue may be scheduled either by SM scheduler 18 or by SR scheduler 20.

The maximum rate scheduler 18 is a work-conserving rate-proportional scheduler. For example, any implementation of Weighted Fair Queuing (WFQ) may be used for this purpose. The work-conserving nature (i.e., virtual-time) of the SM scheduler 18 addresses the underutilization problem of real-time systems, as discussed further below. The SM scheduler 18 is used to guarantee that additional service of any queue does not exceed maximum rates specified for each queue. The SR scheduler 20 provides a minimum rate guarantee to each queue. SR scheduler 20 may be a work-conserving scheduler similar to SM scheduler 18, except the rates are set to R instead of M−R. Alternatively, the SR scheduler 20 may be any rate-controller which ensures that each queue achieves its minimal rate guarantee.

The structure of ST scheduler 16 depends on the type of SR scheduler 20 that is used. If the SR scheduler 20 is work-conserving, ST scheduler 16 is used to ensure that both SR and SM schedulers are rate-controlled to the sum of R(i) and M(i)−R(i) respectively, where the sum is taken over all active queues. In this case, if Sum(M−R)<Link_speed−Sum(R) then ST scheduler 16 is non-work-conserving. If the ST scheduler 16 chooses SR scheduler 20, a packet is sent from the queue chosen by the SR scheduler. If the ST scheduler 16 chooses SM scheduler 18, a packet is sent from the queue chosen by the SM scheduler. If neither SM nor SR is chosen (because neither is eligible), no packets are sent.

If SR scheduler 20 is rate-controlled, then only SM scheduler 18 needs to be rate-controlled to the rate equal to the sum of M(i)−R(i), whereas SR scheduler 20 can be given all remaining scheduling opportunities.

The following is one embodiment of the scheduling system described above. In this embodiment, a constant time implementation of SM and SR schedulers 18, 20 is used. The system is composed of two calendar queue systems, generally indicated at 30 in FIG. 2. One calendar queue implements the SM scheduler 18 and is used to schedule queues to share excess bandwidth and impose maximum rates. The other calendar queue implements the SR scheduler 20 and is used to schedule queues to guarantee their minimum rates.

Figure 2:
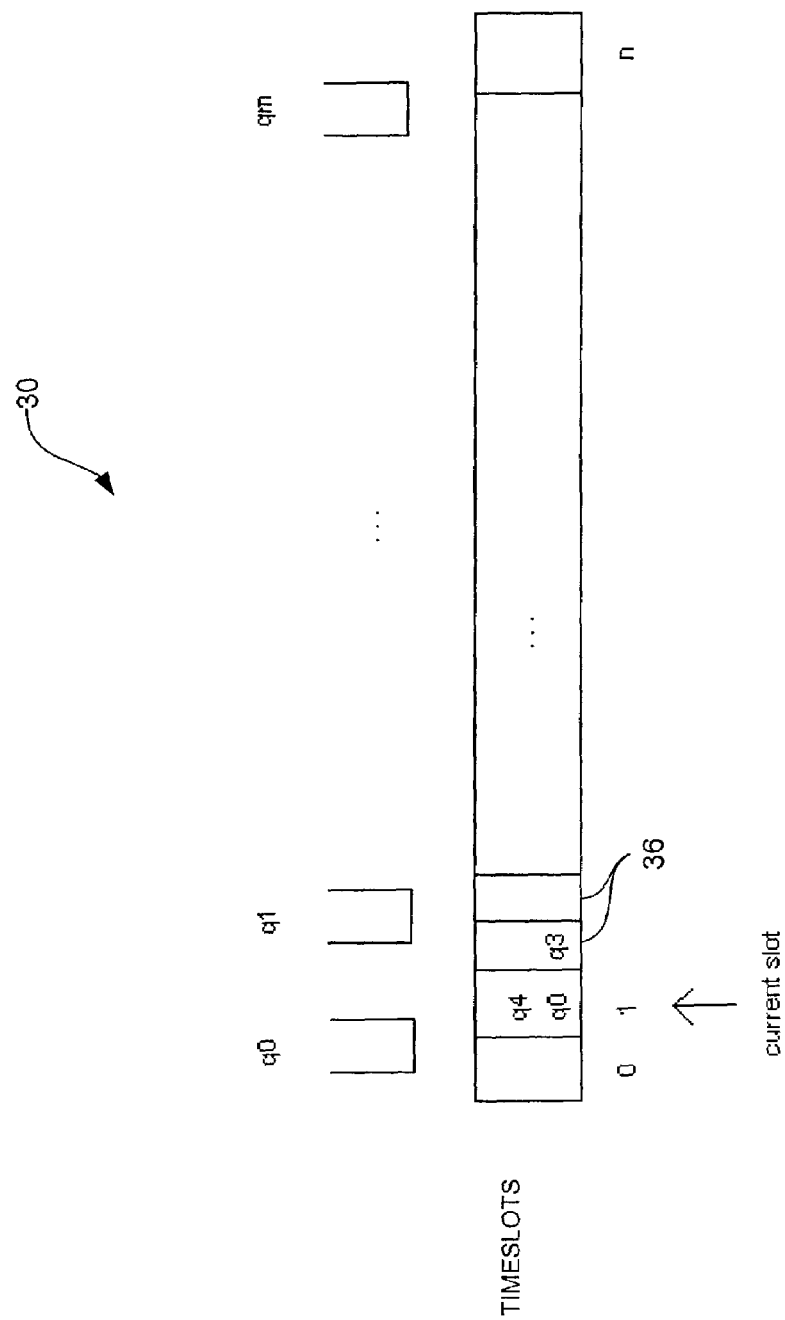
FIG. 2 is a block diagram illustrating calendar queues of the scheduling system.

The system preferably utilizes virtual time calendar queues (as opposed to real-time calendar queue). The calendar queues 30 each include n timeslots 36, as shown in FIG. 2. Each timeslot 36 is associated with a particular time and each slot may contain (logically or physically) a list of packets to be served when time reaches the value associated with the timeslot. The calendar queue system 30 further includes m class queues that are scheduled by the calendar queues. The calendar queues 30 have several configurable parameters: time associated with the calendar queue timeslots (two options include virtual-time or real-time); granularity of the timeslots into the calendar queue; number of timeslots in the calendar queue; number of class queues; and the weight assigned to each class queue. The weight determines where into the calendar queue (i.e., which timeslot) a packet from the class gets scheduled. Preferably, both of the SM and SR schedulers 18, 20 are scheduled in virtual time, with queues in the SR scheduler scheduled based on their rate R, and queues in the scheduler SM scheduled based on M−R.

Once the ST scheduler 16 is informed about a rate change for either SM scheduler 18 or SR scheduler 20, it either adjusts its rate immediately or schedules a rate adjustment for a later time as described below. The following example describes an ideal ST scheduler 16. The ideal ST scheduler 16 maintains a total number of bits N_sr(t) and N_mr(t) served by SR and SM schedulers 20, 18, respectively by time t. Initially N_sr(0)=0 and N_sm(0)=0. The ideal ST scheduler 16 also maintains an ideal number of bits I_sr(t) and I_sm(t) that should have been served by each of ST and SM schedulers 16, 18 by time t, given the rate history. In particular, if r(0), r(1) . . . r(n) is the rate history such that r(0) is the aggregate shaping rate in the scheduler at t=0, r(n) is the rate at time t, and t(1) . . . t(n−1) are the times the rate changes occurred, then:

$$I(t)=\text{Sum}\_j=1\char`^n(t(j)-t(j-1))r(j).$$

At each scheduling opportunity at time t;
if I_sr(t)≧N_sr(t) then ST declares SR (or SM) eligible;
if I_sr(t)<N_sr(t) then ST declares SR (or SM) ineligible.

If SR scheduler 20 is eligible, then it is chosen by ST scheduler 16, and a packet is dequeued from the SR calendar queue 30. Since SR scheduler 20 has a virtual time calendar queue, it has a packet to send as long as at least one queue is non-empty. If SR scheduler 20 is not eligible, but SM scheduler 18 is, then the appropriate packet is dequeued from the SM calendar queue 30. If neither SM nor SR schedulers 18, 20 are eligible, then the ST scheduler 16 stalls for the duration of transmission of a minimum-size packet at link speed.

It is to be understood that that the description of the ideal scheduler ST is provided for ease of understanding of the overall scheduling method. In practice any known rate-controlled scheduling implementation may be used to approximate this ideal scheduler.

The following describes the details of how packets are enqueued and dequeued within the SM and SR schedulers 18, 20. The details of when the changes to the aggregate shaping rates of the SM and SR schedulers 18, 20 in the ST scheduler 16 occur are also described.

The SM 18 (or SR 20) scheduler operates in 'scheduling opportunities' which correspond to the time of transmission of the current packet at link speed. It is assumed that any aggregate rate changes that may be required due to these new arrivals occur instantaneously at the end of the current scheduling opportunity. This rate change also reflects, if necessary, any aggregate rate adjustment due to the departure of the packet scheduled in this scheduling opportunity.

In a calendar queue implementation, while a queue is active, after the queue is serviced, the queue is rescheduled in the calendar system at time L/R in the future, where L is the length of the packet just sent and R is the configured rate of the queue, based on the configured rate of the queue. However, there are different ways to handle the case when a queue becomes empty or busy.

Figure 3:
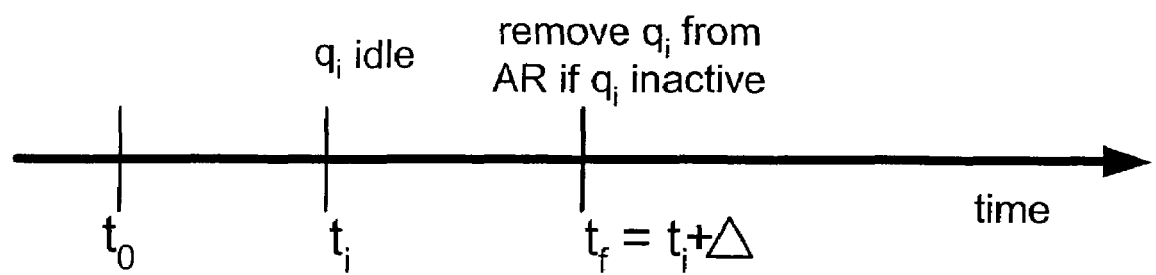
FIG. 3 is a timeline illustrating inactive queue rate removals in the scheduling system.

One option is to remove the queue from the calendar queue (and its rate removed from the schedulers aggregate rate) immediately after the queue becomes empty, and then put it back in the then current slot in the calendar (and add its rate to the aggregate shaping rate) when the queue becomes busy again. However, this may cause a violation of the minimal rate guarantee. Therefore, the busy-to-empty queue transition is handled as follows. If a queue becomes empty after its packet was scheduled (time t, in FIG. 3), the queue is rescheduled into the future slot ($t_f$ in FIG. 3) where it would have been scheduled if there had been more packets on the class queue, (i.e., in current slot plus the appropriate rate interval). This ensures that if a new packet arrives before this queues next scheduling opportunity (which would happen if its arrival rate is sufficient to sustain the rate guarantee), then the queue is placed into the appropriate slot. If the next packet of this queue arrives when the scheduler has already passed the next scheduling slot (which will happen if the arrival rate is slower than the minimal rate guarantee), then the queue is scheduled in the current slot at the time it becomes busy again.

If there are large numbers of "empty" queues that need servicing, then there is potential for not having sufficient time to service the real packets. In order to prevent this, instead of rescheduling the newly inactive queue into the calendar queue system at future time slot T, the value T is instead stored along with the queue, so that when the queue again becomes active, the current time can be compared to T, and if current time is less than T, the queue is scheduled into slot T, whereas if current time is greater than T, the queue is be scheduled into the current slot.

As previously discussed, removing the queue's rate immediately upon the queue becoming busy may cause a violation of the rate guarantee. It is desirable to schedule the rate decrementing event close to the time the departed packet should have finished its service at its ideal rate. To achieve this, a separate real time schedule is maintained, in which rate removals are scheduled. The granularity of the real time schedule is chosen as the time of transmission of minimum size packet at link speed.

When a queue is scheduled and as a result it transitions to the inactive state, an event is scheduled in the real time schedule for time T=max(now, t+I), where I is based on the rate of the queue in this scheduler, and t is the real time corresponding to the instant when the scheduler started servicing the current slot in the virtual time calendar queue. If now>t+I, the rate removal occurs immediately and this corresponds to the case where a large number of packets are scheduled for the current slot, and the packet is delayed behind packets of other queues in the scheduler longer than if it started transmission the moment the scheduler started serving the current slot. Otherwise, if the queue remains inactive until time T, then at time T the aggregate shape rate will be decremented by the corresponding queue rate ($t_f$ in FIG. 3). If the queue becomes active again prior to T, then the decrement event is canceled. And if the queue becomes active again after time T, then the aggregate shape rate is incremented by the appropriate rate value of the queue, as described earlier.

Each slot in the real-time schedule is associated with the combined rate change that needs to happen at that time. This ensures that the operation can be performed in constant time. More specifically, as various queues become inactive, the value associated with the appropriate slot in the real-time schedule is incremented. Similarly, as queues become active again and an event must be canceled, the value in the appropriate interval is simply decremented. Since the granularity of the real time calendar is preferably chosen to correspond to the duration of the scheduling opportunity of minimal size packet, at most one rate decrementing event may take place during each such scheduling opportunity. For larger size packets the complexity of the rate removal event increases linearly with the packet size, but so is the duration of the scheduling opportunity in which this change needs to occur, so the amount of work per unit time is still O(1).

As described above, SR scheduler 20 provides each flow its rate R (as long as there is enough traffic to sustain it) and SM scheduler 18 guarantees each flow its M−R rate. If either of these schedulers 18, 20 exceeds its rate, then the combined rate received by a flow will violate the maximum rate constraint. Therefore, in a preferred embodiment, the system further includes a mechanism to ensure that not only the rates are guaranteed in each scheduler 18, 20, but that those rates are not exceeded.

For example, if a packet that caused the queue to become empty was queued after a large number of other packets in the slot, it is transmitted much later than the rate decrease should have occurred. That corresponds to the case when the rate removal event is scheduled to T=now=max(now, t+1) (i.e., when now>t+I). This means that the scheduler should have removed the rate at time now−(t+I), but did not and the scheduler served r(now−(t+I)) too many bits in that interval. To compensate for this, a fictitious queue is scheduled into the current slot and a fictitious packet of length X=r(now−(t+I)) is added into the queue. If the scheduler gets to this fictitious queue, it schedules all fictitious packets in the queue until none are left. Scheduling a fictitious packet means that the scheduler stalls for the duration of transmission of the packet of length X at link speed. This stalling compensates for the excessive service that had previously been given.

Since both SM and SR schedulers 18, 20 schedule the same queues, when a queue becomes empty, a rate change event is preferably scheduled for both the SM and SR schedulers. Since the queue was previously busy, it must have been scheduled in both schedulers. If it is the scheduling event in the SM scheduler 18 that causes this queue to become empty, then as discussed above, its next scheduling slot in SM scheduler is stored with the queue. In addition, the queue needs to be removed from the next slot that this queue is currently scheduled for in the SR scheduler 20, and that next slot in the SR scheduler also needs to be stored with the queue. This avoids the necessity of skipping slots in one scheduler occupied by queues that became empty when scheduled in the other scheduler.

Figure 4:
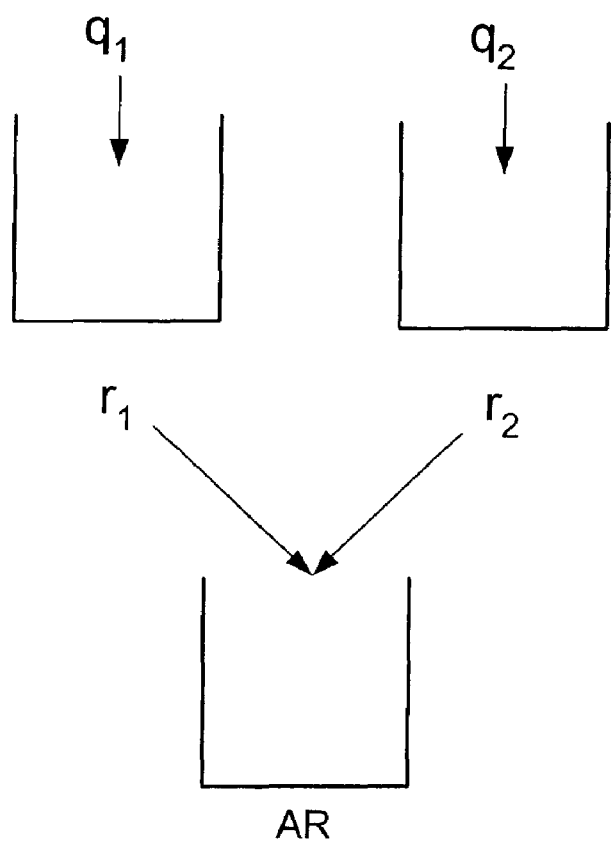
FIG. 4 is a block diagram of queues corresponding to an example of the scheduling system.

The following is an example of the operation of the scheduling system. In this example, the system includes two queues, q1, and q2 (FIG. 4). Rate r1 is assigned to q1 and rate r2 is assigned to q2 in SM. Thus, r1=M1−R1 and r2=M2−R2 (where Mi and Ri are the maximum and minimum rates associated with qi). AR is the aggregate rate at which the output of SM is shaped. Since there are no active queues in the system AR is initially set equal to zero. It is assumed that r1 is equal to two times r2, and all packets are of unit size (i.e., one packet can be sent per unit time). Since r1 is equal to twice r2, this means that when scheduling q1 and q2, q2 will be scheduled every other slot, while q1 will be scheduled every slot.

At time T=1, q1 becomes active and is queued to slot 1, AR is incremented by r1, and q1 is scheduled and then rescheduled to slot 2. At time T=2, q2 becomes active and is queued to slot 2, AR is incremented by r2, and q1 is scheduled and then rescheduled to slot 3. At time T=3, q2 is scheduled and then rescheduled to slot 4. At time T=4, q1 is scheduled and then rescheduled to slot 4, and becomes idle. An event is scheduled to remove r1 from AR at time T=max(now, 3+1) (where now=4, 3 is the current slot, and 1 is the interval at which q1 is scheduled). Thus, max (4,4)=4, and AR is decremented by r1. At time T=5, q2 is scheduled and then rescheduled to slot 6, and becomes idle.

In addition, an event is scheduled to remove r2 from AR at time T=max(now, 4+2) (max(5,6)=6). At time T=6, q1 is scheduled, but not rescheduled since it is idle, and AR is decremented by r2. At time T=7, q2 is scheduled, but not rescheduled since it is idle. In this example, slot 5 is skipped because there is nothing scheduled in slot 5. Table 1 below illustrates this example.

TABLE 1

| Real time | Current slot | Events |
|---|---|---|
| 1 | 1 | q1 becomes active and queued to slot 1 |
|   |   | AR = r1 |
|   |   | q1 scheduled and then rescheduled to slot 2 |
| 2 | 2 | q2 becomes active and queued to slot 2 |
|   |   | AR = r1 + r2 |
|   |   | q1 scheduled and then rescheduled to slot 3 |
| 3 | 2 | q2 scheduled and then rescheduled to slot 4 |
| 4 | 3 | q1 scheduled and then rescheduled to slot 4, and becomes idle event scheduled to remove r1 from AR at time max (now, 3 + 1) AR = r2 |
| 5 | 4 | q2 scheduled and then rescheduled to slot 6, and becomes idle event scheduled to remove r2 from AR at time max (now, 4 + 2) AR = r2 |
| 6 | 4 | q1 scheduled |
|   |   | AR = 0 |
| 7 | 6 | q2 scheduled |

It should be noted that the separate M and R calendars modulated by a time-varied aggregate shaper allow a single constant time operation to have the impact of instantly adapting the rates on a large number of queues, effectively replacing an O(n) operation by a single step. The single operation that has this impact is the adjustment of the aggregate service rate of the SM and SR schedulers 18, 20. Adjustment of the aggregate rate effectively adjusts the individual rate of all queues in the system (i.e., the individual rates all scale up or down at the same time). That is, by having the separate SM and SR systems, it is possible to assign appropriate individual service ratios (i.e., the SR tree has ratios in proportion to R, and the SM tree has ratios in proportion to M–R) so that single aggregate rate adjustments allow for all individual adjustments to occur such that all R and M values are achieved.

Servicing the individual queues at their M–R rate, combined with the dynamic aggregate shaping mechanism, ensures that no queue exceeds its maximum rate, all while executing in constant time. It is also the virtual time system, combined with a dynamic aggregate shape rate that allows the system to behave as desired in both the underbooked and overbooked scenario. In the overbooked scenario (i.e., there is not sufficient available bandwidth to allow queues to reach their maximum rate M), all queues are allowed to use as much bandwidth as is available and share that available bandwidth in the defined proportion, while in the underbooked scenario (i.e., there is sufficient bandwidth available for all queues to reach their maximum rate M) the system imposes the maximum rates M on the queues. In real-time systems it is difficult to gracefully transition between the underbooked to overbooked scenarios.

It is to be understood that modifications may be made to the above described system without departing from the scope of the invention. For example, an approach where ST scheduler 16 polled SM and SR schedulers 18, 20 for "eligibility" was previously described. In the case of constant rates this could be implemented by two token buckets, polled at each scheduling opportunity. Extensions to computing eligibility times for variable rate shapers are well known by those skilled in the art. Furthermore, ST scheduler 16 need not be token-bucket based. For example, the ST scheduler 16 could implement RE, described in "Hierarchical Relative Error Scheduler, An Efficient Traffic Shaper for Packet Switching Networks" A. Charny, in Proc Nossdav, 1997. In this case there is no notion of "eligibility" necessary.

Figure 5:
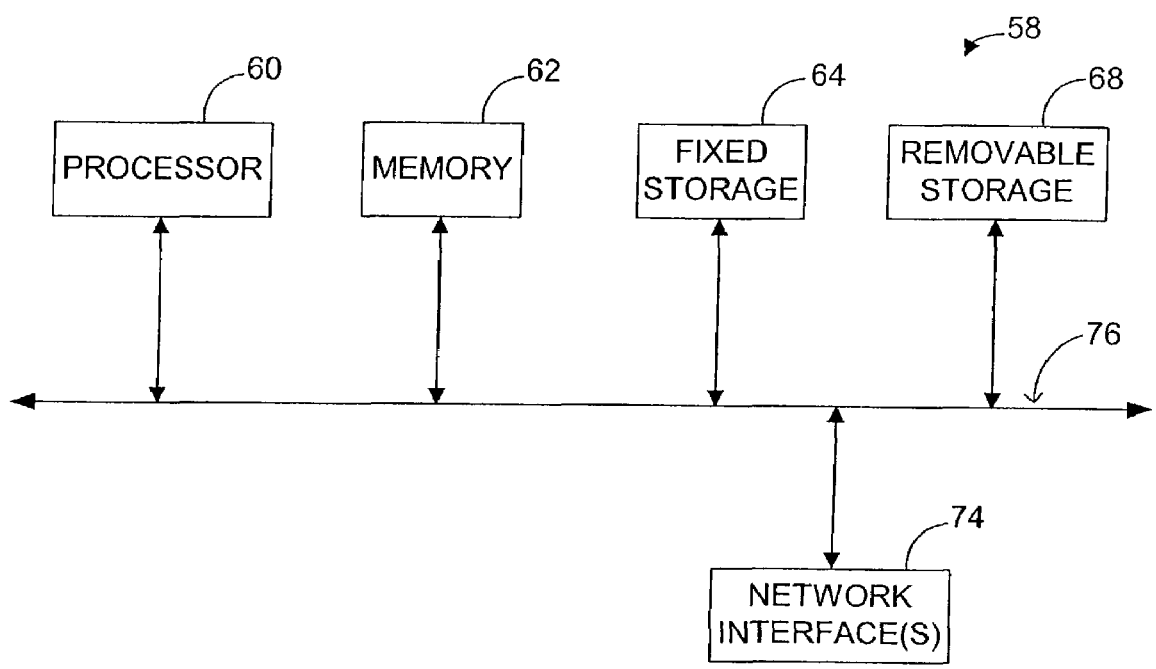
FIG. 5 is a system block diagram of a computer system that can be utilized to execute software of an embodiment of the present invention.

FIG. 5 shows a system block diagram of computer system 58 that may be used to execute software of an embodiment of the invention. The computer system 58 includes memory 62 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave may be the computer readable storage medium. Computer system 58 further includes subsystems such as a central processor 60, fixed storage 64, removable storage 68, and one or more network interfaces 74. Other computer systems suitable for use with the invention may include additional or fewer subsystems.

The system bus architecture of computer system 58 is represented by arrows 76 in FIG. 5. However, these arrows are only illustrative of one possible interconnection scheme serving to link the subsystems. For example, a local bus may be utilized to connect the central processor 60 to the system memory 62. Computer system 58 shown in FIG. 5 is only one example of a computer system suitable for use with the invention. Other computer architectures having different configurations of subsystems may also be utilized. Communication between computers within the network is made possible with the use of communication protocols, which govern how computers exchange information over a network.

As can be observed from the foregoing, the present invention has numerous advantages. A method disclosed herein scales better than linearly with the number of queues, guarantees a minimal rate to each queue, limits the maximum rate of each queue, and ensures full utilization of a link as long as it is possible without violation of the maximum rate limits.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A rate-based scheduling system configured for receiving data streams at a plurality of queues, the system comprising:
    a first scheduler operable to limit maximum rates at each of said plurality of queues, said first scheduler configured as a work conserving scheduler shaped at an aggregate rate of active queues of said plurality of queues;
    a second scheduler operable to provide a minimum rate to each of said plurality of queues;
    a virtual time calendar queue associated with each of said schedulers; and
    a variable-rate rate controller at a top level of the hierarchy configured to select said first or second scheduler for scheduling one of said plurality of queues and modulate the rate of at least one of the first and second schedulers located at a lower level in the hierarchy.

2. The system of claim 1 wherein said second scheduler is a work conserving scheduler.

3. The system of claim 1 wherein the top-level scheduler shapes said second scheduler to an aggregate rate equal to the sum of minimal rates of all said active queues.

4. The system of claim 1 wherein said second scheduler is a rate controller.

5. The system of claim 1 wherein the first scheduler is configured such that each of said plurality of queues receives a share of excess available bandwidth.

6. A method of rate-based scheduling a plurality of data packets arriving at a node having a plurality of queues with a scheduling system having a first scheduler operable to limit maximum rates at each of said plurality of queues, said first scheduler configured as a work conserving scheduler shaped at an aggregate rate of active queues of said plurality of queues, a second scheduler operable to provide a minimum rate to each of said plurality of queues, and a virtual time calendar queue associated with each of said schedulers; the method comprising;
modulating rates of at least one of said first and second scheduler with a variable-rate rate controller; and
shaping an aggregate scheduling rate of said first and second schedulers to a rate that is dynamically changing as a function of the rates of currently active queues;
wherein the rate controller is located at a top level in a hierarchy of the scheduling system and said first and second schedulers are located at a lower level in the hierarchy.

7. The method of claim 6 wherein each of said first and second schedulers is scheduled in virtual time.

8. The method of claim 6 further comprising using a calendar queue to schedule queues at said first and second schedulers.

9. The method of claim 6 further comprising selecting between said first and second schedulers with a top-level scheduler.

10. The method of claim 6 further comprising rescheduling an empty queue into a future slot in which it would have been scheduled if there had been more packets on the queue.

11. The method of claim 6 further comprising incrementing the aggregate shape rate by a rate value of the queue when the queue becomes active.

12. A computer program product for rate based scheduling a plurality of data packets arriving at a node having a plurality of queues with a scheduling system having a first scheduler operable to limit maximum rates at each of said plurality of queues, said first scheduler configured as a work conserving scheduler shaped at an aggregate rate of active queues of said plurality of queues, a second scheduler operable to provide a minimum rate to each of said plurality of queues, and a virtual time calendar queue associated with each of said schedulers; the product comprising:
code that modulates of said first and second schedulers with a variable-rate rate controller;
code that shapes an aggregate scheduling rate of said first and second schedulers to a rate that is dynamically changing as a function of the number of currently active queues; and
a computer-readable storage medium for storing said codes;
wherein the rate controller is located at a top level in a hierarchy of the scheduling system and said first and second schedulers are located at a lower level in the hierarchy.

13. The product of claim 12 wherein each of said first and second schedulers is scheduled in virtual time.

14. The product of claim 12 further comprising rescheduling an empty queue into a future slot in which it would have been scheduled if there had been more packets on the queue.

15. The product of claim 12 further comprising incrementing the aggregate shape rate by a rate value of the queue when the queue becomes active.

16. The method of claim 6 further comprising rescheduling one of said plurality of queues after the queue has been serviced, wherein the queue is rescheduled at a time equal to a length of a packet just sent divided by a configured rate of the queue.

17. The system of claim 1 wherein the rate controller comprises token buckets.

18. The system of claim 1 wherein the rate controller is configured to limit the amount of bandwidth provided to the first scheduler by the sum of:

$$M(i)-R(i)$$

over said plurality of queues which are active;
where $M(i)$ is the maximum rate at each of said plurality of queues and $R(i)$ is the minimum rate at each of said plurality of queues.

19. The system of claim 1 wherein the system is configured such that shaping rates of the rate controller dynamically change as a function of the rates of active queues.

20. The method of claim 6 wherein shaping an aggregate scheduling rate of said first and second schedulers comprises:
if a queue becomes empty,
removing a minimum rate of said queue from an aggregate shaping rate of said second scheduler; and
removing the difference between a maximum rate of said queue and the minimum rate of said queue from an aggregate shaping rate of said first scheduler.

* * * * *